United States Patent
Lee et al.

(10) Patent No.: US 12,015,152 B2
(45) Date of Patent: Jun. 18, 2024

(54) POSITIVE ELECTRODE ACTIVE MATERIAL, MANUFACTURING METHOD THEREOF, AND POSITIVE ELECTRODE FOR LITHIUM SECONDARY BATTERY COMPRISING THE SAME

(71) Applicant: SK On Co., Ltd., Seoul (KR)

(72) Inventors: Sang Han Lee, Daejeon (KR); Sang Wook Lee, Daejeon (KR); Byoung Beom Lim, Daejeon (KR); Yong Hyun Cho, Daejeon (KR)

(73) Assignee: SK On Co., Ltd., Seoul (KR)

( * ) Notice: Subject to any disclaimer, the term of this patent is extended or adjusted under 35 U.S.C. 154(b) by 0 days.

(21) Appl. No.: 18/346,301

(22) Filed: Jul. 3, 2023

(65) Prior Publication Data
US 2024/0128447 A1    Apr. 18, 2024

(30) Foreign Application Priority Data
Oct. 12, 2022    (KR) .......................... 10-2022-0130721

(51) Int. Cl.
H01M 4/505    (2010.01)
C01G 53/00    (2006.01)
H01M 4/131    (2010.01)
H01M 4/525    (2010.01)
H01M 4/02    (2006.01)

(52) U.S. Cl.
CPC ............ *H01M 4/505* (2013.01); *C01G 53/50* (2013.01); *H01M 4/131* (2013.01); *H01M 4/525* (2013.01); C01P 2002/52 (2013.01); C01P 2002/60 (2013.01); C01P 2002/74 (2013.01); C01P 2006/40 (2013.01); H01M 2004/021 (2013.01); H01M 2004/028 (2013.01)

(58) Field of Classification Search
None
See application file for complete search history.

(56) References Cited

U.S. PATENT DOCUMENTS

2004/0265216 A1* 12/2004 Nazri ................ C01G 53/42
                                                                            423/594.4
2022/0250938 A1    8/2022 Huang et al.

FOREIGN PATENT DOCUMENTS

| CN | 1812934 A | 8/2006 |
| EP | 3886212 A1 | 9/2021 |
| KR | 1020190040923 A | 4/2019 |
| KR | 1020190086403 A | 7/2019 |

* cited by examiner

*Primary Examiner* — Carlos Barcena
(74) *Attorney, Agent, or Firm* — The Webb Law Firm (57) ABSTRACT

A positive electrode active material may include a lithium layer doped with a first doping element and a transition metal layer doped with a second doping element. An I(003)/I(006) peak intensity ratio in X-ray diffraction measurement is equal to or less than 23.8.

9 Claims, 4 Drawing Sheets

POSITIVE ELECTRODE ACTIVE MATERIAL, MANUFACTURING METHOD THEREOF, AND POSITIVE ELECTRODE FOR LITHIUM SECONDARY BATTERY COMPRISING THE SAME

CROSS-REFERENCE TO RELATED APPLICATION

The present application claims priority to Korean Patent Application No. 10-2022-0130721 filed Oct. 12, 2022, the disclosure of which is incorporated by reference in its entirety.

BACKGROUND OF THE INVENTION

1. Field of the Invention

Examples of the present invention relate to a positive electrode active material, a manufacturing method thereof, and a positive electrode for lithium secondary battery comprising the same.

2. Description of Related Art

With the development of technologies and the increase of the demand for mobile devices, the demand for secondary batteries as an energy source is drastically increasing. Among these secondary batteries, lithium secondary batteries, having high energy density and voltage, long cycle life, and low self-discharge rate, have been commercialized and widely used.

Lithium transition metal composite oxides are used as positive electrode active materials for lithium secondary batteries, and among these, lithium-nickel composite metal oxides have been subject to active research and development because they have high reversible capacity and thus can be used to easily implement large-capacity batteries. However, $LiNiO_2$ has relatively poor thermal stability, and when an internal short circuit is caused in a charged state by external pressure or the like, the positive electrode active material itself is decomposed, resulting in battery rupture and ignition.

Accordingly, as a method for improving the low thermal stability of $LiNiO_2$ while maintaining its excellent reversible capacity, a method of substituting a part of nickel (Ni) with cobalt (Co) or manganese (Mn) has been proposed. $LiNi_{1-x}Co_xO_2$ (x=0.1 to 0.3), in which a part of nickel is substituted with cobalt, shows excellent charge and discharge characteristics and lifespan characteristics but has a problem of exhibiting low thermal stability. In addition, nickel-manganese-based lithium composite metal oxides, in which a part of Ni is substituted with Mn having excellent thermal stability, and nickel-cobalt-manganese-based lithium composite metal oxides, in which a part of Ni is substituted with Mn and Co, show low output characteristics and have a risk of eluting metal elements and deteriorating the battery characteristics thereby.

To solve these problems, a new type of positive electrode active material for lithium secondary batteries is required.

SUMMARY OF THE INVENTION

An Example of the present invention provides a positive electrode active material having excellent cell characteristics even at high temperatures, a manufacturing method thereof, and a positive electrode for lithium secondary batteries comprising the same.

The positive electrode active material according to an Example of the present invention may comprise a lithium layer doped with a first doping element and a transition metal layer doped with a second doping element, wherein an I(003)/I(006) peak intensity ratio in X-ray diffraction measurement may be equal to or less than 23.8.

A manufacturing method of a positive electrode active material according to an Example of the present invention may comprise: mixing a lithium compound, a transition metal compound, a compound comprising a first doping element doped into lithium, and a compound comprising a second doping element doped into a transition metal; and calcining a mixture obtained in the mixing such that an I(003)/I(006) peak intensity ratio in X-ray diffraction measurement of a final product is equal to or less than 23.8.

A positive electrode for lithium secondary batteries according to an Example of the present invention may comprise a positive electrode current collector; and a positive electrode active material layer disposed on the positive electrode current collector, wherein the positive electrode active material layer may comprise a lithium layer doped with a first doping element and a transition metal layer doped with a second doping element; and a positive electrode active material of which an I(003)/I(006) peak intensity ratio in X-ray diffraction measurement is equal to or less than 23.8.

According to the present technology, a positive electrode active material having excellent cell characteristics even at a high temperature, a manufacturing method thereof, and a positive electrode for lithium secondary batteries comprising the same are provided.

DESCRIPTION OF THE INVENTION

Structural or functional descriptions of Examples disclosed in the present specification or application are merely illustrated for the purpose of describing Examples according to the technical principle of the present disclosure. In addition, Examples according to the technical principle of the present disclosure may be implemented in various forms other than the Examples disclosed in the present specification or application. In addition, the technical principle of the present disclosure is not to be construed as being limited to the Examples described in this specification or application.

According to an Example of the present invention, a positive electrode active material comprising a lithium layer doped with a first doping element and a transition metal layer doped with a second doping element, wherein an I(003)/I(006) peak intensity ratio in X-ray diffraction measurement is equal to or less than 23.8, may be provided.

Hereinafter, a positive electrode active material according to an Example of the present invention will be described in detail for each ingredient.

First, a positive electrode active material according to an Example of the present invention comprises a lithium layer.

A lithium layer may be doped with a first doping element.

An effective ion radius of a first doping element may be 50 pm to 100 pm, preferably 60 pm to 80 pm, and more preferably 70 pm to 80 pm. Cations of a first doping element may have an ion radius similar to that of lithium ions, and thus may diffuse into a lithium layer in a positive electrode active material to be located at lithium ion sites.

A first doping element may be an element having a hexacoordinate structure.

A first doping element may have an oxidation number of +1 to +2.

A first doping element may be, for example, one or more elements selected from the group consisting of Mg, $V^{+1\sim2}$, Cr, Cu, Zn, and Ge.

In one Example, a first doping element may be doped in the form of a metal ion, and when a doping element is used in the form of an oxide or a hydroxide, since the effective ion radius is different depending on the oxidation number of the doping element, various sizes may be selected.

Next, a positive electrode active material according to an Example of the present invention comprises a transition metal layer.

A transition metal layer may be doped with a second doping element.

The effective ion radius of a second doping element may be 30 pm to 70 pm, preferably 45 pm to 70 pm, more preferably 50 pm to 65 pm, and most preferably 55 pm to 61 pm. The effective ion radius of a second doping element may be smaller than the effective ion radius of a first doping element.

A second doping element may be an element having a hexacoordinate structure.

A second doping element may have an oxidation number of +2 to −4.

A second doping element may be, for example, one or more elements selected from the group consisting of Ti, Fe, As, Zr, Al, Nb, Mo, $Tc^{+4\sim6}$, $Ru^{+3\sim5}$, $Rh^{+3\sim5}$, Pd, $V^{+3\sim5}$, and $Te^{+4\sim6}$.

In one Example, a second doping element may be doped in the form of a metal ion, and when a doping element is used in the form of an oxide or hydroxide, since the effective ion radius is different depending on the oxidation number of the doping element, various sizes may be selected.

A positive electrode active material according to an Example of the present invention may be in the form of a lithium transition metal oxide.

A lithium transition metal oxide may be, for example, one or more selected from the group consisting of lithium-cobalt-based oxides, lithium-manganese-based oxides, lithium-nickel-manganese-based oxides, lithium-manganese-cobalt-based oxides, and lithium-nickel-manganese-cobalt-based oxides.

In one Example, a lithium transition metal oxide may be represented by Formula 1 below.

$$Li_{x-a}M^1_a Ni_{1-y-b}M^2_y M^3_b O_{2+z}$$ [Formula 1]

Here, $M^1$ may be the first doping element, $M^2$ may be the second doping element, and $M^3$ may be one or more elements selected from the group consisting of Mn, Co, and Al.

In addition, $0.95 \leq x-a \leq 1.1$, y may be $0 \leq y+b \leq 0.7$, and z may be $-0.1 \leq z \leq 0.1$.

In an Example, a lithium transition metal oxide may be a single particle. A single particle may be a concept distinct from secondary particles formed by aggregating dozens or more particles or from particles formed by aggregating dozens or more particles and coating the periphery of the agglomerate. By having the shape of a single particle, breakage of the particles can be prevented even at a high electrode density. Therefore, a positive electrode active material of a high energy density may be implemented. In addition, compared to secondary particles in which a plurality of single particles are agglomerated, breakage during rolling may be suppressed so that a high energy density may be implemented, and deterioration of the life span due to breakage of particles may be prevented.

A lithium transition metal oxide may have a single crystal structure or a polycrystalline structure comprising two or more single crystals. Single crystal may mean having only one crystal within a particle.

The positive electrode active material according to an Example of the present invention may have an I(003)/I(006) peak intensity ratio equal to or less than 23.8 in X-ray diffraction measurement.

When a lithium layer and a transition metal layer are doped with a first doping element and a second doping element, respectively, the I(003)/I(006) peak intensity ratio is reduced compared to the case where the lithium layer and the transition metal layer are not doped. At this time, for a positive electrode active material that is doped such that the I(003)/I(006) peak intensity ratio is equal to or less than 23.8, the capacity retention rate at a high temperature may be significantly improved, and the amount of gas generation may be significantly reduced.

In secondary batteries in a high-temperature environment, a metal of a transition metal layer may move to a lithium layer so that cations may be mixed therein, thereby deteriorating the lifespan, capacity, and output. In addition, in a lithium layer, lithium may escape from the lithium layer during charging, and thus the structural stability of the lithium layer is significantly decreased, thereby causing problems such as deintercalation of oxygen and accelerated decomposition of an electrolyte.

In a positive electrode active material according to an Example of the present invention, a lithium layer and a transition metal layer may be doped to have an I(003)/I(006) peak intensity ratio of a specific range so that the stability of the positive electrode active material at a high temperature may be improved. A I(003)/I(006) peak intensity ratio of a positive electrode active material within a desired range may be obtained by adjusting the selection of doping elements, doping amount, and synthesis conditions.

In addition, the positive electrode active material according to an Example of the present invention may have a crystal grain size of 250 μm to 1000 μm. At this time, the crystal grain size may be a value measured through X-ray diffraction. In one Example, the crystal grain size may be a value obtained by calculating through the Scherrer equation (Equation 1 below) by using a full width at half maximum (FWHM) obtained through XRD analysis.

$$L = 0.9\lambda/\beta \cos\theta$$ [Equation 1]

In Equation 1, L is the grain size, λ is the X-ray wavelength, β is the FWHM of the peak, and θ is the diffraction angle. In illustrative Examples, the FWHM in the XRD analysis for measuring the grain size may be measured from the peak of the (003) plane.

In some Examples, as β in Equation 1 above, an FWHM obtained by correcting a value derived from the equipment may be used. In one Example, Si may be used as a reference material to reflect an equipment-derived value. In this case, an equipment-derived FWHM may be expressed as a function of 2θ by fitting the FWHM profile in the entire 2θ range of Si. Thereafter, a value corrected by subtracting the equipment-derived FWHM value at the corresponding 2θ, obtained from the function, may be used as β.

A positive electrode active material according to an Example of the present invention may have a discharge capacity of 140+0.738×WNi or more. WNi may refer to the mass percentage of nickel in a positive electrode active material.

According to an Example of the present invention, a manufacturing method of a positive electrode active material, comprising the steps of: mixing a lithium compound, a transition metal compound, a compound comprising a first doping element doped into lithium, and a compound comprising a second doping element doped into a transition metal; and calcining a mixture obtained in the mixing such that an I(003)/I(006) peak intensity ratio in X-ray diffraction measurement of a final product is equal to or less than 23.8, may be provided.

Hereinafter, a manufacturing method of a positive electrode active material according to an Example of the present invention will be described in detail for each step.

First, manufacturing method of a positive electrode active material according to an Example of the present invention may comprise mixing a lithium compound, a transition metal compound, a compound comprising a first doping element doped into lithium, and a compound comprising a second doping element doped into a transition metal.

In one Example, mixing a lithium compound, a transition metal compound, a compound comprising a first doping element doped into lithium, and a compound comprising a second doping element doped into a transition metal may be performed by adding a compound comprising a first doping element and a compound comprising a second doping element to a mixture of a lithium compound and a transition metal compound.

As the lithium compound and the transition metal compound, a lithium compound and a transition metal compound that are commonly used in the technical field for manufacturing a positive electrode active material may be used.

As a lithium compound, a lithium-containing sulfate, nitrate, acetate, carbonate, oxalate, citrate, halide, hydroxide or oxyhydroxide may be used, but is not particularly limited. Specifically, the lithium compound may be $Li_2CO_3$, $LiNO_3$, $LiNO_2$, LiOH, $LiOH—H_2O$, LiH, LiF, LiCl, LiBr, LiI, $CH_3COOLi$, $Li_2O$, $Li_2SO_4$, $CH_3COOLi$, $Li_3C_6H_5O_7$ or the like, and any one or a mixture of two or more thereof may be used.

As the transition metal compound, at least one selected from the group consisting of an oxides, hydroxide, nitroxide, chloride, and carbonate of a transition metal may be used, but is not limited thereto. In one Example, an transition metal compound may be manufactured from a plurality of metal precursor solutions having different concentrations. For example, a metal precursor solution may each be a nickel-containing compound, a cobalt-containing compound, and a manganese-containing compound, and more specifically, a nickel salt, a manganese salt, and a cobalt salt. Examples of the nickel salt comprise nickel sulfate, nickel hydroxide, nickel nitrate, nickel acetate, and hydrates thereof. Examples of the manganese salt comprise manganese sulfate, manganese acetate, and hydrates thereof. Examples of the cobalt salt comprise cobalt sulfate, cobalt nitrate, cobalt carbonate, and hydrates thereof.

Metal precursor compounds may be mixed by adjusting the content or concentration of the solution to satisfy Formula 1 above. A mixture in which metal precursor compounds are mixed may further comprise a precipitating agent and/or a chelating agent. A mixture in which metal precursor compounds are mixed may be in the form of a solution, more specifically, an aqueous solution. A precipitating agent may comprise, for example, an alkaline compound such as sodium hydroxide (NaOH), sodium carbonate ($Na_2CO_3$). A chelating agent may comprise, for example, ammonia water (e.g., $NH_4OH$), ammonium carbonate (e.g., $NH_3HCO_3$), and the like. A mixture in which metal precursor compounds are mixed may be coprecipitated in a reactor to form a transition metal compound.

Thereafter, a lithium compound and a transition metal compound may be mixed, and a mixture of a lithium compound and a transition metal compound may be doped with a first doping element and a second doping element. At this time, the mixture of a lithium compound and a transition metal compound may have a form of a lithium-transition metal composite through calcination or the like.

A first doping element may be an element doped into lithium. A compound comprising a first doping element may be an oxide, hydroxide, nitroxide, chloride, and carbonate of a first doping element. In a compound comprising a first doping element, cations of a first doping element may be diffused into the lithium layer to be included, and anions paired with the first doping element may be deintercalated in a subsequent calcination process so that doping may be performed only with cations of a first doping element. For example, when a compound comprising a first doping element is used in the form of an oxide and an hydroxide of a first doping element, cations of a first doping element may be diffused into the lithium layer to be included, and oxygen ions and hydroxide ions paired with cations of the first doping element may be deintercalated in a subsequent calcination process as $O_2$ (g), CO (g), $CO_2$ (g), H2O, and the like so that doping may be performed only with cations. In addition, when a compound comprising a first doping element is used in the form of an oxide of the first doping element, a solid solution may be formed with a lithium compound. A first doping element may be an element having a hexacoordinate structure. A first doping element may have an oxidation number of +1 to +2. A first doping element may be, for example, one or more elements selected from the group consisting of Mg, V, Cr, Cu, Zn, and Ge.

A second doping element may be an element doped into a transition metal. A compound comprising a second doping element may be an oxide, hydroxide, nitric oxide, chloride, and carbonate of a second doping element. In a compound comprising a second doping element, cations of a second doping element may be diffused into the lithium layer to be included, and anions paired with a second doping element may be deintercalated in a subsequent calcination process so that doping may be performed only with cations of a second doping element. For example, when a compound comprising a second doping element is used in the form of an oxide and an hydroxide of a second doping element, cations of a second doping element may be diffused into the lithium layer to be included, and oxygen ions and hydroxide ions paired with cations of the second doping element may be deintercalated in a subsequent calcination process as $O_2$ (g), CO (g), $CO_2$ (g), H2O, and the like so that doping may be performed only with cations. A second doping element may be an element having a hexacoordinate structure. A second doping element may have an oxidation number of +2 to +4. A second doping element may be, for example, one or more elements selected from the group consisting of Ti, Fe, As, and Zr.

In one Example, adding a mixture comprising a compound comprising a first doping element and a compound comprising a second doping element may be performed simultaneously with calcinating, which will be described below.

In addition, the manufacturing method of a positive electrode active material according to an Example of the present invention may comprise calcinating a mixture obtained in the mixing.

When a final product obtained by calcinating the mixture is measured by X-ray diffraction, the I(003)/I(006) peak intensity ratio may be equal to or less than 23.8.

During calcinating, a first doping element may be included in a lithium layer, and a second doping element may be included in a transition metal layer.

In one Example, the calcinating may be carried out at a temperature of 600° C. to 1000° C., and may be performed for 5 hours to 36 hours.

By adjusting various conditions during calcinating, the I(003)/I(006) peak intensity ratio can be adjusted to be equal to or less than 23.8 when measured by X-ray diffraction.

In one Example, calcinating may be performed for 1 hour to 30 hours, preferably 1 hour to 15 hours under a temperature condition of 700° C. to 1,000° C. in oxygen-containing atmosphere.

In addition, after doping with a first doping element and a second doping element, an additional heat treatment step for coating a positive electrode active material may be further included. An additional heat treatment step may be performed at a temperature lower than that of calcinating. In one Example, an additional heat treatment step may be performed immediately after calcinating. For example, an additional heat treatment step may be performed for 1 hour to 15 hours under a temperature condition of 600° C. to 850° C. in oxygen-containing atmosphere.

According to an Example of the present invention, a positive electrode for lithium secondary batteries, comprising: a positive electrode current collector; and a positive electrode active material layer disposed on the positive electrode current collector, wherein the positive electrode active material layer comprises a lithium layer doped with a first doping element and a transition metal layer doped with a second doping element; and a positive electrode active material of which an I(003)/I(006) peak intensity ratio in X-ray diffraction measurement is equal to or less than 23.8.

Hereinafter, a positive electrode for lithium secondary batteries according to an Example of the present invention will be described in detail for each feature.

First, a positive electrode for lithium secondary batteries according to an Example of the present invention comprises a positive electrode current collector.

A positive current collector is not particularly limited as long as it has conductivity without causing a chemical change to batteries, and for example, stainless steel, aluminum, nickel, titanium, calcinated carbon, or stainless steel of which surface is surface-treated with carbon, nickel, titanium, silver or the like may be used. In addition, the positive electrode current collector may have a thickness of typically 3 µm to 50 µm, and fine irregularities or whiskers through etching may be formed on the surface of the current collector to increase adhesion of a positive electrode active material. For example, a positive current collector may be used in various forms such as film, sheet, foil, net, porous material, foam, and non-woven fabric.

Next, a positive electrode for lithium secondary batteries according to an Example of the present invention comprises a positive electrode active material layer.

A positive electrode active material layer may comprise a positive electrode active material, a conductive material, and a binder.

A positive electrode active material may comprise a lithium layer doped with a first doping element and a transition metal layer doped with a second doping element, and the I(003)/I(006) peak intensity ratio measured by X-ray diffraction may be equal to or less than 23.8. Since a positive electrode active material has been described above, it will not be repeatedly described.

A conductive material, which is used to grant conductivity to an electrode, may be used without particular limitation as long as it has electronic conductivity without causing a chemical change to batteries. Specific examples comprise graphite such as natural graphite or artificial graphite; carbon-based materials such as carbon black, acetylene black, Ketjenblack, Channel Black, Furnace Black, Lamp Black, Summer Black, and carbon fiber; metal powders or metal fibers of copper, nickel, aluminum, silver, and the like; conductive whiskers of zinc oxide, potassium titanate, and the like; conductive metal oxides such as titanium oxide; or conductive polymers such as polyphenylene derivatives, and one of them alone or a mixture of two or more thereof may be used. The conductive material may typically be included in an amount of 1% to 30% by weight based on the total weight of a positive electrode active material layer.

A binder plays the role of improving adhesion between particles of a positive electrode active material and adhesion between a positive electrode active material and a current collector. Specific examples comprise polyvinylidene fluoride (PVDF), polyvinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, ethylene-propylene-diene polymer (EPDM), sulfonated-EPDM, styrene butadiene rubber (SBR), fluororubber, or various copolymers thereof, and one of them alone or a mixture of two or more thereof may be used. The binder may be included in an amount of 1% to 30% by weight based on the total weight of a positive electrode active material layer.

A positive electrode may be manufactured according to a conventional manufacturing method of a positive electrode, except for using the positive electrode active materials described above. Specifically, a positive electrode may be manufactured by coating a composition for forming a positive electrode active material layer, the composition prepared by mixing or dispersing the positive electrode active material described above and, optionally, a binder and a conductive material in a solvent, and then drying and rolling the same. At this time, the types and contents of a positive electrode active material, a binder, and a conductive material are as described above.

The solvent may be a solvent commonly used in the technical field, and examples comprise dimethyl sulfoxide (DMSO), isopropyl alcohol, N-methylpyrrolidone (NMP), acetone, or water, and among these, one of them alone or a mixture of two or more thereof may be used. The used amount of a solvent is sufficient if the positive electrode active material, conductive material, and binder may be dissolved or dispersed in a solvent in consideration of the coating thickness and the manufacturing yield of a slurry and then excellent thickness uniformity may be exhibited in the subsequent coating for the manufacturing of a positive electrode.

In addition, as another method, the positive electrode may be manufactured by casting the composition for forming a positive electrode active material layer on a separate support and then laminating a film obtained by exfoliating from the support on a positive electrode current collector.

In one Example, when a lithium secondary battery is an all-solid-state battery, a positive electrode may further comprise a solid electrolyte.

According to another Example of the present invention, an electrochemical device comprising the positive electrode may be provided.

Since a positive electrode has been described above, it will not be repeatedly described.

The electrochemical device may be specifically a battery, a capacitor, and the like, and more specifically, may be a lithium secondary battery.

Specifically, the lithium secondary battery may comprise a positive electrode, a negative electrode located to face the positive electrode, a separator interposed between the positive electrode and the negative electrode, and an electrolyte. If an electrolyte is a solid electrolyte, the electrolyte may play the roles of both a separator and an electrolyte, and a separate separator may be omitted.

A positive electrode is as described above. In addition, the lithium secondary battery may optionally further comprise a battery container accommodating an electrode assembly of the positive electrode, the negative electrode, and the separator; and a sealing member sealing the battery container.

In the lithium secondary battery, the negative electrode comprises a negative electrode current collector and a negative electrode active material layer located on the negative electrode current collector.

The negative current collector is not particularly limited as long as it has high electronic conductivity without causing a chemical change to batteries, and for example, copper, stainless steel, aluminum, nickel, titanium, calcinated carbon, copper or stainless steel of which surface is surface-treated with carbon, nickel, titanium, silver or the like, and an aluminum-cadmium alloy may be used. In addition, the negative electrode current collector may have a thickness of typically 3 μm to 50 μm, and as a positive electrode current collector, fine irregularities or whiskers through etching may be formed on the surface of the current collector to increase adhesion of a negative electrode active material. For example, a negative current collector may be used in various forms such as film, sheet, foil, net, porous material, foam, and non-woven fabric.

A negative active material layer optionally comprises a binder and a conductive material together with a negative active material.

A compound allowing for reversible intercalation and deintercalation of lithium may be used as a negative electrode active material. Specific examples comprise carbonaceous materials such as artificial graphite, natural graphite, graphitized carbon fiber, and amorphous carbon; metallic compounds capable of being alloyed with lithium, such as Si, Al, Sn, Pb, Zn, Bi, In, Mg, Ga, Cd, Si alloys, Sn alloys, or Al alloys; metal oxides capable of doping and dedoping lithium, such as $SiO_x$ (0<x<2), $SnO_2$, vanadium oxide, and lithium vanadium oxide; or a composite comprising the metallic compound and the carbonaceous material, such as a Si—C composite or a Sn—C composite, and one of them alone or a mixture of two or more thereof may be used. In addition, a metal lithium thin film may be used as the negative electrode active material. In addition, as a carbon material, both low-crystallinity carbon and high-crystallinity carbon may be used. Representative examples of low-crystallinity carbon are soft carbon and hard carbon, and representative examples of high-crystallinity carbon are high-temperature calcinated carbons such as amorphous, platy, scaly, spherical or fibrous natural graphite or artificial graphite, Kish graphite, pyrolytic carbon, mesophase pitch based carbon fiber, meso-carbon microbeads, mesophase pitches, and petroleum or coal tar pitch derived cokes.

In addition, the binder and the conductive material may be the same as those described about a positive electrode above.

As an example, a negative electrode active material layer may be manufactured by applying a composition for forming a negative electrode, the composition prepared by dispersing a negative electrode active material, and optionally a binder and a conductive material in a solvent, on a negative electrode current collector and then drying same, or by the composition for forming a negative electrode on a separate support and then laminating a film obtained by exfoliating from the support on a negative electrode current collector.

In one Example, when a lithium secondary battery is an all-solid-state battery, a negative electrode may further comprise a solid electrolyte.

On the other hand, in lithium secondary batteries, any separator that is commonly used as a separator in lithium secondary batteries may be used without particular limitation as long as it separates a negative electrode and a positive electrode and provides a passage for lithium ions to move provides, preferably, having low resistance to ion migration of an electrolyte and excellent electrolyte absorption capacity. Specifically, a porous polymer film, for example, a porous polymer film made of polyolefin-based polymers such as ethylene homopolymer, propylene homopolymer, ethylene/butene copolymer, ethylene/hexene copolymer, and ethylene/methacrylate copolymer, or a laminated structure of two or more layers thereof may be used. In addition, a conventional porous non-woven fabrics, for example, non-woven fabrics made of high-melting point glass fibers, polyethylene terephthalate fiber, and the like may be used. In addition, to secure heat resistance or mechanical strength, a coated separator comprising a ceramic component or a polymer material may be used, and optionally, may be used as a single layer or multilayer structure. Alternatively, when a solid electrolyte is used as an electrolyte, the solid electrolyte may play the role of a separator simultaneously.

Specifically, an electrolyte may comprise an organic solvent and a lithium salt.

Any organic solvent that can play the role of a medium through which ions involved in electrochemical reactions of a battery may migrate may be used without particular limitation. Specifically, as the organic solvent, ester-based solvents such as methyl acetate, ethyl acetate, γ-butyrolactone, and ε-caprolactone; ether-based solvents such as dibutyl ether and tetrahydrofuran; ketone-based solvents such as cyclohexanone; aromatic hydrocarbon-based solvents such as benzene and fluorobenzene; carbonate-based solvents such as dimethylcarbonate (DMC), diethylcarbonate (DEC), methylethylcarbonate (MEC), ethylmethylcarbonate (EMC), ethylene carbonate (EC), and propylene carbonate (PC); alcohol-based solvents such as ethyl alcohol and isopropyl alcohol; nitriles such as R-CN (wherein R is a C2 to C20 straight-chain, branched or cyclic hydrocarbon group, and may comprise a double-bonded aromatic ring or an ether bond); amides such as dimethylformamide; dioxolanes such as 1,3-dioxolane; or sulfolanes or the like may be used. Among these, a carbonate-based solvent is preferable, and a mixture of a cyclic carbonate (e.g., ethylene carbonate or propylene carbonate, etc.) having high ion conductivity and high dielectric constant capable of increasing the charge and discharge performance of batteries and a low-viscosity linear carbonate-based compound (e.g., ethyl methyl carbonate, dimethyl carbonate or diethyl carbonate) is more preferable. In this case, a cyclic carbonate and a linear carbonate may be mixed at a volumetric ratio of about 1:1 to about 1:9 to exhibit excellent electrolyte performance.

As the lithium salt, any compound that is capable of providing lithium ions to lithium secondary batteries may be used without particular limitation. Specifically, as the lithium salt, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, or $LiB(C_2O_4)_2$ or the like may be used. A concentration of the lithium salt within the range of 0.1 M to 2.0 M may be preferably used. When the concentration of a lithium salt is included in the range above, since the electrolyte has appropriate conductivity and viscosity, excellent electrolyte performance can be exhibited, and lithium ions can migrate effectively.

In addition to the electrolyte ingredients described above, the electrolyte may further comprise one or more additives such as, for example, haloalkylene carbonate-based compounds such as difluoroethylene carbonate, pyridine, triethyl phosphate, triethanolamine, cyclic ether, ethylene diamine, n-glyme, hexamethyl phosphoric triamide, nitrobenzene derivative, sulfur, quinone imine dye, N-substituted oxazolidinone, N,N-substituted imidazolidine, ethylene glycol dialkyl ether, ammonium salt, pyrrole, 2-methoxy ethanol or aluminum trichloride. At this time, the additive may be included in an amount of 0.1% to 5% by weight based on the total weight of an electrolyte.

As described above, lithium secondary batteries comprising a positive electrode active material according to the present invention has excellent cell characteristics and thus can be useful in the fields of portable devices such as mobile phones, laptop computers, and digital cameras and electric vehicles such as hybrid electric vehicles (HEV).

Therefore, according to another Example of the present invention, a battery module comprising the lithium secondary battery as a unit cell and a battery pack comprising the same are provided.

A battery module or a battery pack may be used as a medium or large-sized device power source of one or more of power tools; electric vehicles comprising electric vehicles (EVs), HEVs, and plug-in hybrid electric vehicles (PHEVs); or energy storage systems.

The appearance of a lithium secondary battery according to the present invention is not particularly limited, but may be a cylindrical shape using a can, a prismatic shape, a pouch shape, or a coin shape.

A lithium secondary battery according to the present invention may be used not only as a battery cell used as a power source for a small device, but also may preferably be used as a unit cell in a medium or large-sized battery module comprising a plurality of battery cells.

Hereinafter, the present invention will be described in more detail based on Examples. However, the following Examples are only examples for explaining the present invention in more detail, and the present invention is not limited by the following Examples.

Example 1-1

After adding Mg as a first doping element and Al as a second doping element to a mixture in which a lithium compound and a transition metal compound are mixed, calcinating was performed. Accordingly, a positive electrode active material in which a lithium layer doped with Mg and a transition metal layer doped with Al were alternately laminated were manufactured, thereby obtaining an I(003)/I(006) peak ratio in X-ray diffraction measurement shown in Table 1.

Example 1-2

A positive electrode having an I(003)/I(006) peak ratio in X-ray diffraction measurement shown in Table 1 was manufactured in the same manner as in Example 1-1, except that the calcinating temperature was changed.

Example 1-3

A positive electrode having an I(003)/I(006) peak ratio in X-ray diffraction measurement shown in Table 1 was manufactured in the same manner as in Example 1-1, except for changing the calcinating temperature.

Example 2-1

A positive electrode having an I(003)/I(006) peak ratio in X-ray diffraction measurement shown in Table 1 was manufactured in the same manner as in Example 1-1, except for doping the lithium layer with Mg and the transition metal layer with Al and changing the calcinating temperature.

Example 2-2

A positive electrode having an I(003)/I(006) peak ratio in X-ray diffraction measurement shown in Table 1 was manufactured in the same manner as in Example 2-1, except for changing the calcinating temperature.

Example 2-3

A positive electrode having an I(003)/I(006) peak ratio in X-ray diffraction measurement shown in Table 1 was manufactured in the same manner as in Example 2-1, except for changing the calcinating temperature.

Example 2-4

A positive electrode was manufactured in the same manner as in Example 2-1, except for changing the I(003)/I(006) peak ratio in X-ray diffraction measurement by changing the calcinating temperature.

Example 3

Manufacturing of a Lithium Secondary Battery

Lithium secondary batteries each comprising the positive electrode active materials of Examples 1-1 to 1-3 and Examples 2-1 to 2-4 were manufactured.

A positive electrode slurry was manufactured by mixing the positive electrode active material, Denka Black as a conductive material, and PVDF as a binder in a mass ratio composition of 97:2:1, respectively, and then coated on an aluminum current collector and then rolled to manufacture a positive electrode for a lithium secondary battery.

A negative electrode comprising natural graphite and SiO as a negative electrode active material, 5% by weight of KS6, a flake type conductive material, 1% by weight of styrene-butadiene rubber (SBR) as a binder, and 1% by weight of carboxymethyl cellulose (CMC) as a thickener was manufactured.

A negative electrode for a lithium secondary battery was manufactured by coating the negative electrode slurry on a copper current collector and then rolling the same.

Thereafter, a separator (polyethylene, 25 μm in thickness) was disposed between the positive electrode and the negative electrode to form an electrode cell together with the positive electrode and the negative electrode, and tab portions of the positive electrode and the negative electrode were each welded. The welded positive electrode/separator/negative electrode combination was disposed in a pouch and sealed on three sides except for an electrolyte injection side. After injecting an electrolyte into the pouch and sealing the remaining surface, impregnation was performed for 12 hours or more. The electrolyte used was prepared by dissolving 1 M $LiPF_6$ in a mixed solvent of EC/EMC/DEC (25/45/30; volumetric ratio) and adding 1% by weight of vinylene carbonate (VC) and 0.5% by weight of 1,3-propensultone (PRS), and 0.5% by weight of lithium bis(oxalato)borate (LiBOB).

Experimental Example 1

Measurement of I(003)/I(006) Peak Intensity Ratio

Example 1-1 to Example 1-3 and Example 2-1 to Example 2-4 were subjected to X-ray diffraction analysis (X-ray diffraction), and the ratio of the intensity of the I(003) peak to the intensity of the (006) peak (I(003)/I(006) peak intensity ratio) is shown in Table 1 below.

TABLE 1

| Example | I(003)/I(006) peak intensity ratio |
|---|---|
| Example 1-1 | 23.6 |
| Example 1-2 | 24.5 |
| Example 1-3 | 24.2 |
| Example 2-1 | 22.6 |
| Example 2-2 | 23.2 |
| Example 2-3 | 23.0 |
| Example 2-4 | 23.9 |

Experimental Example 2

Evaluation of High-Temperature Life Characteristics (Capacity Retention Rate)

For the lithium secondary batteries each comprising the positive electrode active materials of Examples 1-1 to 1-3 and Examples 2-1 to 2-4, manufactured through Example 3, CC/CV charging (1 C 4.2 V 0.05 C CUT-OFF) and CC discharging (1 C 2.7 V CUT-OFF) were performed at 45° C.

The lithium secondary batteries having an initial capacity of C1 were repeatedly charged and discharged 500 times, and the discharge capacity C2 was measured at the 500th time.

The high-temperature capacity retention rate was calculated according to Equation 2 below, and the results are graphically shown in FIGS. 2 to 4.

High temperature capacity retention rate (%)=C2/C1×100(%)     [Equation 2]

Figure 1:
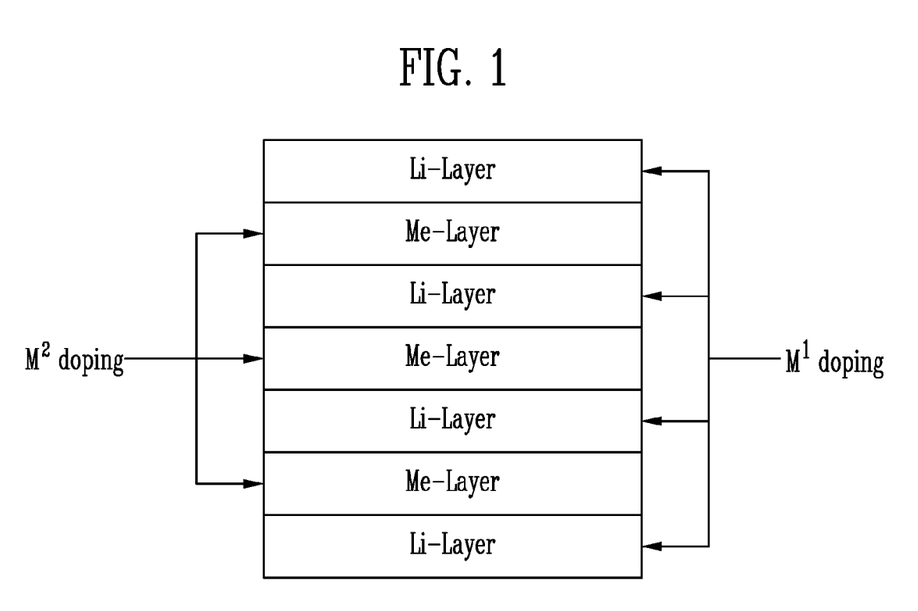
FIG. 1 is a diagram for explaining the structure of a positive electrode active material according to an Example of the present invention.
Figure 2:
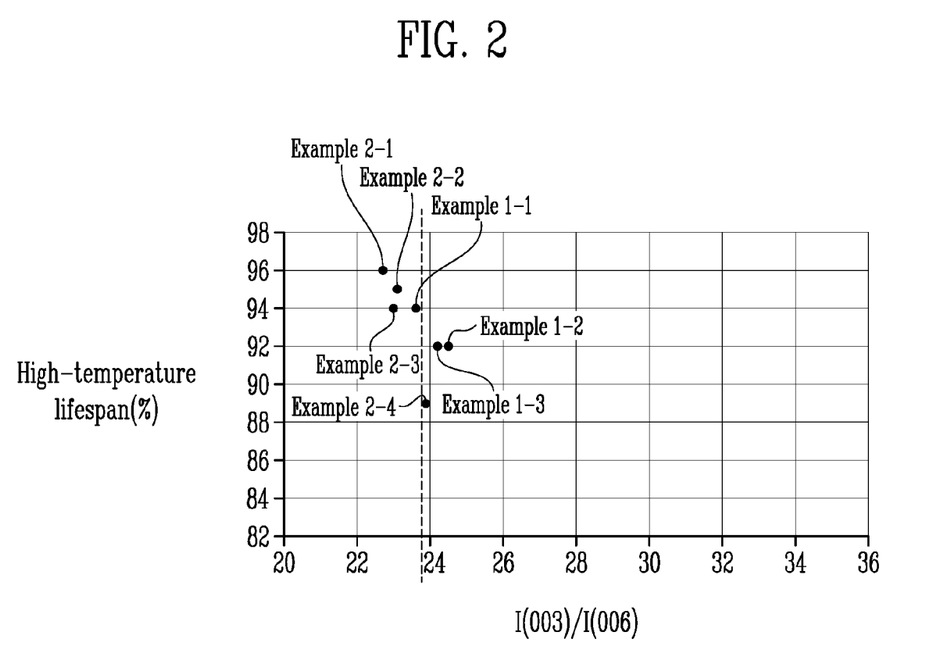
FIG. 2 is a graph showing the high-temperature lifetime according to the I(003)/I(006) peak intensity ratio of a positive electrode active material according to an Example of the present invention.
Figure 3:
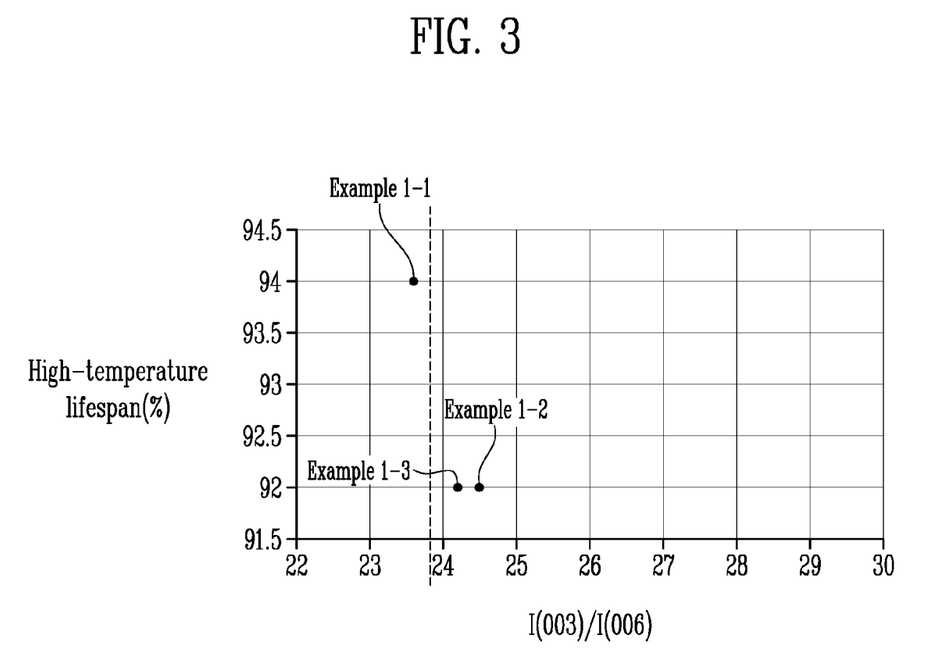
FIG. 3 is a graph showing the high-temperature lifetime as a function of I(003)/I(006) peak intensity ratio for some of the Examples shown in FIG. 2.
Figure 4:
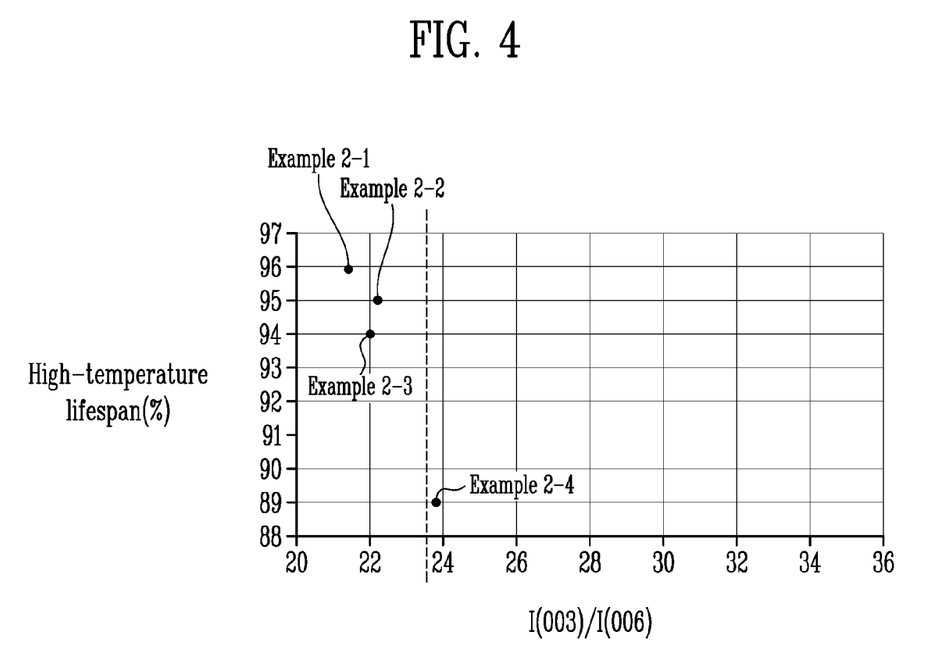
FIG. 4 is a graph showing the high-temperature lifetime as a function of I(003)/I(006) peak intensity ratio for some of the Examples shown in FIG. 2.

FIG. 3 is an enlarged diagram of the results of Examples 1-1 to 1-3 shown in FIG. 2, and FIG. 4 is an enlarged diagram of the results of Examples 2-1 to 2-4 shown in FIG. 2.

Referring to FIGS. 2 and 3, the capacity retention rate of Example 1-1 in which the I(003)/I(006) peak intensity ratio was 23.6 was 94%, indicating that the high-temperature retention rate was significantly increased compared to Examples 1-2 and 1-3 in which the I(003)/I(006) peak intensity ratio was 24.5 and 24.2, respectively.

In addition, referring FIGS. 2 and 4, the capacity retention rate of Example 2-1 in which the I(003)/I(006) peak intensity ratio was 22.6 was 96%; the I(003)/I(006) peak intensity ratio of Example 2-2 in which the I(003)/I(006) peak intensity ratio was 23.2 was 96%; and the I(003)/I(006) peak intensity ratio of Example 2-3 in which the I(003)/I(006) peak intensity ratio was 23.0 was 94%, indicating that the high-temperature retention rate was significantly increased compared to Example 2-4 in which the I(003)/I(006) peak intensity ratio was 23.9.

Experimental Example 3

Evaluation of the Amount of High-Temperature Gas Generation

The lithium secondary batteries each comprising the positive electrode active materials of Examples 1-1 to 1-3 and Examples 2-1 to 2-4 were each charged under CC (Constant Current)/CV (Constant Voltage) conditions (1 C 4.2 V 0.1 C CUT-OFF) and stored in a constant temperature chamber at 60° C. for 8 weeks, and the amount of gas generation was measured through GC analysis. The results are shown in Table 2. To measure the total amount of gas generation, a hole was formed on the vacuum chamber of a predetermined volume (V), and the volume of gas generation was calculated by measuring a pressure change.

TABLE 2

| Example | Amount of high-temperature gas generation |
|---|---|
| Example 1-1 | 22.1 |
| Example 1-2 | 25.9 |
| Example 1-3 | 30.5 |
| Example 2-1 | 30.7 |
| Example 2-2 | 30.8 |
| Example 2-3 | 34 |
| Example 2-4 | 42 |

Referring to Table 2, the amount of high-temperature gas generation in Example 1-1 in which the I(003)/I(006) peak intensity ratio was 23.6 was 22.1 mL, indicating that the amount of gas generation was significantly reduced compared to Examples 1-2 and 1-3 in which the I(003)/I(006) peak intensity ratio was 24.5 and 24.2, respectively.

In addition, referring to Table 2, the amount of high-temperature gas generation in Example 2-1 in which the I(003)/I(006) peak intensity ratio was 22.6 was 30.7 mL; the amount of high-temperature gas generation in Example 2-2 in which the I(003)/I(006) peak intensity ratio was 23.2 was 30.8 mL; and the amount of high-temperature gas generation in Example 2-3 in which the I(003)/I(006) peak intensity ratio was 23.0 was 34 mL, indicating that the amount of high temperature gas generation was significantly reduced compared to Example 2-4 in which the I(003)/I(006) peak intensity ratio was 23.9.

What is claimed is:

1. A positive electrode active material comprising a lithium layer doped with a first doping element and a transition metal layer doped with a second doping element, wherein an I(003)/I(006) peak intensity ratio in X-ray diffraction measurement is equal to or less than 23.8,
wherein the first doping element is one or more elements selected from the group consisting of Mg, V, Cr, Cu, Zn, and Ge, and wherein the second doping element is one or more elements selected from the group consisting of Ti, Fe, As, Zr, Al, Nb, Mo, Tc, Ru, Rh, Pd, V, and Te,
wherein the first doping element and the second doping element are an element having a hexacoordinate structure,
wherein the first doping element has an oxidation number of +1 to +2, and
wherein the second doping element has an oxidation number of +2 to +4 and wherein the positive electrode active material has a crystal grain size of 250 nm to 1000 nm.

2. The positive electrode active material according to claim 1, wherein the first doping element has an effective ion radius larger than that of the second doping element.

3. The positive electrode active material according to claim 2, wherein the first doping element has an effective ion radius of 60 pm to 80 pm.

4. The positive electrode active material according to claim 2, wherein the second doping element has an effective ion radius of 30 pm to 70 pm.

5. The positive electrode active material according to claim 1 is a positive electrode active material represented by Formula 1:

$$Li_{x-a}M^1_aNi_{1-y-b}M^2_yM^3_bO_{2+z}$$ [Formula 1]

wherein in Formula 1, $M^1$ is the first doping element, $M^2$ is the second doping element, and $M^3$ is one or more elements selected from the group consisting of Mn, Co, and Al, and $0.9 \leq x-a \leq 1.1$, y is $0 \leq y+b \leq 0.7$, and z is $-0.1 \leq z \leq 0.1$.

6. The positive electrode active material according to claim 5, wherein the positive electrode active material has a discharge capacity of $140+0.738 \times W_{Ni}$ or more ($W_{Ni}$ refers to the mass percentage of nickel in a positive electrode active material).

7. The positive electrode active material according to claim 1, wherein the positive electrode active material is a single particle.

8. A manufacturing method of a positive electrode active material, comprising the steps of:
mixing a lithium compound, a transition metal compound, a compound comprising a first doping element doped into lithium, and a compound comprising a second doping element doped into a transition metal; and
calcining a mixture obtained in the mixing such that an I(003)/I(006) peak intensity ratio in X-ray diffraction measurement of a final product is equal to or less than 23.8,
wherein the first doping element is one or more elements selected from the group consisting of Mg, V, Cr, Cu, Zn, and Ge, and wherein the second doping element is one or more elements selected from the group consisting of Ti, Fe, As, Zr, Al, Nb, Mo, Tc, Ru, Rh, Pd, V, and Te,
wherein the first doping element and the second doping element are an element having a hexacoordinate structure,
wherein the first doping element has an oxidation number of +1 to +2, and
wherein the second doping element has an oxidation number of +2 to +4and wherein the positive electrode active material has a crystal grain size of 250 nm to 1000 nm.

9. A positive electrode for lithium secondary batteries, comprising:
a positive electrode current collector; and
a positive electrode active material layer disposed on the positive electrode current collector,
wherein the positive electrode active material layer comprises a lithium layer doped with a first doping element and a transition metal layer doped with a second doping element; and a positive electrode active material of which an I(003)/I(006) peak intensity ratio in X-ray diffraction measurement is equal to or less than 23.8,
wherein the first doping element is one or more elements selected from the group consisting of Mg, V, Cr, Cu, Zn, and Ge, and wherein the second doping element is one or more elements selected from the group consisting of Ti, Fe, As, Zr, Al, Nb, Mo, Tc, Ru, Rh, Pd, V, and Te,
wherein the first doping element and the second doping element are an element having a hexacoordinate structure,
wherein the first doping element has an oxidation number of +1 to +2, and
wherein the second doping element has an oxidation number of +2 to +4 and wherein the positive electrode active material has a crystal grain size of 250 nm to 1000 nm.

* * * * *